J. H. GEORGE.
METALLIC BARREL.
APPLICATION FILED MAR. 24, 1911.
Reissued May 7, 1912.
13,414.
Fig. 1.
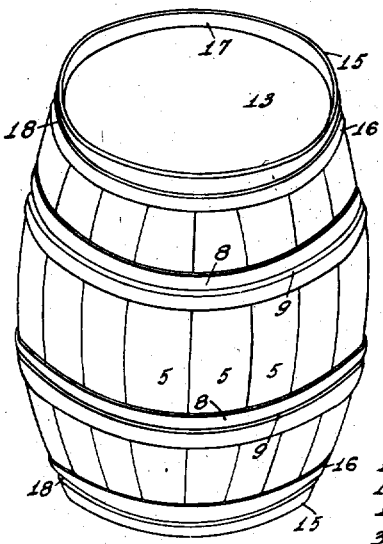
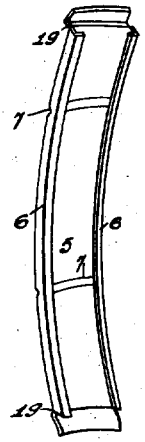
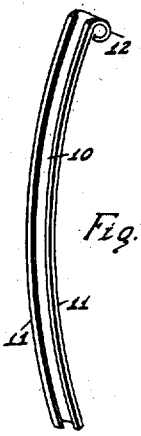
Fig. 4.
Fig. 2.
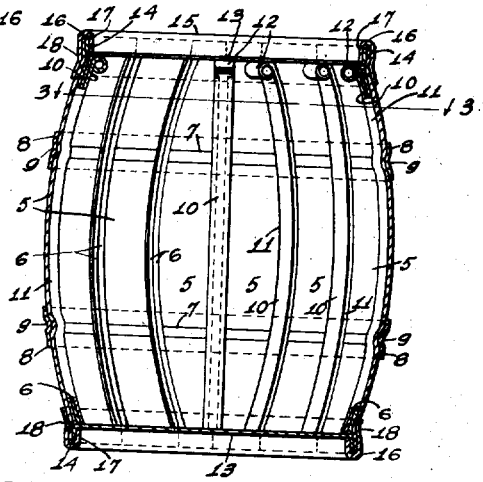
Fig. 3.
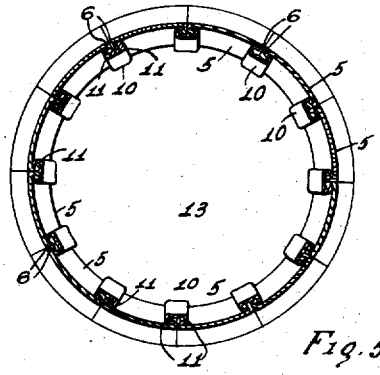
Fig. 5.
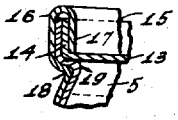
Witnesses:
C. Bartels
L. L. Mayer
Inventor
James H. George
By his Attorney.
Criswell & Criswell.
THE NORR'S PETERS CO., PHOTO-LITHO., WASHINGTON, D. C.

UNITED STATES PATENT OFFICE.

JAMES H. GEORGE, OF NEW YORK, N. Y., ASSIGNOR TO NATIONAL STEEL BARREL COMPANY, A CORPORATION OF MAINE.

METALLIC BARREL.

13,414. Specification of Reissued Letters Patent. Reissued May 7, 1912.

Original No. 967,629, dated August 16, 1910, Serial No. 528,677. Application for reissue filed March 24, 1911. Serial No. 616,782.

*To all whom it may concern:*

Be it known that I, JAMES H. GEORGE, a citizen of the United States, residing at New York city, in the county of New York and State of New York, have invented certain new and useful Improvements in Metallic Barrels, of which the following is a specification.

My invention relates to an improvement in metallic barrels, and it has for its object the production of a structure of this character which shall possess great strength and rigidity to withstand strains incident to the transportation and rough handling to which receptacles of this character are subjected.

A further object of my invention is to provide a metallic vessel of this character the several parts of which may be shipped in "knock-down" or separated relation.

A further object of my invention is to provide a device of this character which is simple and cheap in its construction, composed of few parts and one in which the parts may be readily assembled.

With these and other objects in view, my invention consists in certain constructions, combinations and arrangement of parts the preferred form of which will be first described in connection with the accompanying drawings and then the invention particularly pointed out in the appended claims.

Referring to the drawings wherein the same part is designated by the same reference numeral wherever it occurs: Figure 1 is a perspective view of a barrel constructed in accordance with my invention; Fig. 2 is a central longitudinal section of the same with some parts removed to more clearly show the construction; Fig. 3 is a section taken on line 3—3 of Fig. 2; Fig. 4 is a detached perspective view of a stave and the device for securing the adjacent edges of the staves together, and Fig. 5 is a fragmentary sectional view of one end of the barrel.

The staves 5 are provided with the inturned side edges 6 forming flanges which however do not extend the full length of the stave, but said flanges stop short of each end of the stave as best shown in Fig. 4. These flanges as will be seen are L-shaped in cross section and extend over the side portions of the body of the staves. The staves in my form of barrel are preferably curved to about the same curvature as wooden staves used in the construction of the ordinary wooden barrels. This curvature may however be increased or diminished as desired.

I form in the staves on each side of the central portion thereof depressions or grooves over which the hoops 8 extend, said hoops being provided with an inwardly extending rib 9 adapted to engage in the depressions 7, so as to lock the hoops on the barrel and also to more firmly unite the parts of the barrel together.

10 designates the locking strip which is formed with a central portion of a width to extend over the projecting flanges of two adjacent staves when said staves are in position to form the barrel, the strip being provided with the inwardly extending L-shaped flanges 11 on each side thereof, which engage around the flanges 7 of the staves, as most clearly shown in Fig. 3.

Preferably, and as shown, at one end the strip or locking device 5 is provided with a curled-up portion 12, in order that convenient means may be furnished to remove the locking device and replace the same when desired. The locking device is bar-like in form and is of a length substantially equal to the length of the flanges 6 on the staves.

In the assembling of the barrel a pair of staves are brought with their edges in contact and a locking device 5 is slipped by a lengthwise movement over the flanges thereof. Other staves are then placed alongside of these and similarly locked in position by means of the locking strips or devices until the barrel is completed. The hoops 8 may now be forced on until their interiorly projecting ribs engage the grooves in the staves whereby they are firmly held in position and the staves locked against longitudinal movement.

13 are the heads or ends of the barrel which may be of any suitable and convenient form, and in the construction shown, these heads are formed with their edges bent up to provide annular flanges 14 which, when the heads are in position, rest against the ends of the staves. As the flanges on the edges of the staves do not extend to the ends of the staves, the end portions of these flanges form interior supports or shoulders for the head, as most clearly shown in Fig. 2.

15 is a securing means for holding the heads in position. This means shown comprises a ring 16 of a size to closely fit over the end of the barrel and having the inturned flange 17 which will pass within and engage the upturned flange 14 of the head. Preferably and as shown the ring 16 is provided with an interiorly projecting rib 18 engaging a groove 19 formed in the staves just beyond the ends of the inturned flanges, whereby, when the ring is placed in position on the barrel, said rib will engage the groove and lock the ring on the head.

From the foregoing description of my construction it will be seen that I have devised a barrel in which the meeting edges of the adjacent staves are locked together in such a way as to strengthen the staves and thus increase the strength of the barrel, that the ends of the barrel are further strengthened by the use of my fastening means for the head, and also by the manner in which the head is placed in the barrel. Further, all parts of the barrel are securely held together without the use of any rivets, cotter pins or other form of extraneous fastening device.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. A metallic barrel comprising a plurality of staves, each stave being provided on its edges with inturned flanges, of a securing strip having inturned flanges adapted to extend around the flanges of adjacent staves to secure said staves together, the flanges on the staves and the locking strips being of a length less than the length of the staves, whereby shoulders are formed at the ends of the barrel, heads adapted to extend within the staves with their inner side in contact with the ends of the stave flanges, means for securing said heads in position, said staves being provided intermediate of their ends with annular grooves, and hoops for said barrel provided with inwardly projecting annular ribs adapted to engage the grooves to lock the hoops on the barrel.

2. A metallic barrel comprising a plurality of staves secured together at their adjacent edges, each stave being provided on its edges with inturned flanges, of a securing strip having inturned flanges adapted to extend around the flanges of adjacent staves to secure said staves together, the flanges on the staves and the locking strips being of a length less than the length of the staves whereby shoulders are formed at the ends of the barrel, heads having out-turned flanges on their edges, said heads being adapted to extend within the staves with their inner side in contact with the ends of the stave flanges and locking strips, and rings provided with inturned flanges adapted to be placed over the ends of the barrel to secure the heads in position, said rings being provided with a projecting annular rib and said staves with a registering annular groove to lock said rings in position on the barrel.

3. A metallic barrel comprising a plurality of staves, each stave being provided on its edges with inturned flanges, a bar-like securing strip having inturned flanges adapted to extend around the flanges of adjacent staves throughout substantially their entire length to secure said staves together, the flanges on the staves and the locking strips being of a length less than the length of the staves, whereby shoulders are formed at the ends of the barrel, heads adapted to extend within the staves with their inner side in contact with the ends of the stave flanges, and means for securing said heads in position.

4. A metallic barrel comprising a plurality of staves secured together at their adjacent edges, each stave being provided on its edges with inturned flanges, a securing bar-like strip having inturned flanges adapted to extend around the flanges of adjacent staves to secure said staves together, the flanges on the staves and the locking strips being of a length less than the length of the staves whereby shoulders are formed at the ends of the barrel, heads having outturned flanges on their edges, said heads being adapted to extend within the staves with their inner sides in contact with the ends of the stave flanges and locking strips, and detachable rings provided with inturned flanges adapted to be placed over the ends of the barrel to secure the heads in position.

5. A barrel comprising a plurality of independent staves having inwardly projecting flanges extending the greater part of the entire length of the staves at their edges, each stave having a curved body portion and having a part projecting beyond the flanges at each end which is offset at a point adjacent to the ends, a bar-like locking device having angular flanges forming recesses adapted to receive the flanges of the staves and movable lengthwise thereof, heads adapted to rest against said offset part of the staves within the body formed by the staves, and rings encircling the ends of the staves for detachably holding the heads to the staves.

6. A barrel comprising a plurality of independent staves having inwardly projecting flanges extending the greater part of the entire length of the staves at their edges, each stave having a curved body portion and having a part projecting beyond the flanges at each end which is offset at a point adjacent to the ends to form a seat when the staves are held together, a bar-like locking device having angular flanges forming recesses adapted to receive the flanges of the staves and movable lengthwise thereof, heads having peripheral flanges extending outwardly and adapted to be seated against said offset part of the staves within the same and resting against the ends of the flanges, rings having inwardly extending flanges and fitting over the heads, and means for holding the rings to the staves.

7. A barrel comprising a plurality of independent staves having inwardly projecting flanges extending the greater part of the entire length of the staves at their edges, each stave having a curved body portion and having an offset part at the ends of the flanges forming a seat when the staves are held together, curved bar-like locking devices having means to engage the flanges of the staves and movable lengthwise thereof, and heads detachably held against the offset part of the barrel staves and the ends of the flanges.

8. In a metallic barrel, a number of staves having inturned flanges lengthwise thereof of less length than the staves, longitudinally movable and detachable locking devices located within the barrel having means engaging said inturned flanges throughout substantially their entire length for holding the staves together, and a head resting against the ends of said flanges.

9. A barrel comprising a plurality of independent staves having inwardly projecting flanges extending the greater part of the entire length of the staves at their edges, each stave having a curved body portion and having a part projecting beyond the flanges at each end which is offset at a point adjacent to the ends, a bar-like locking device having angular flanges forming recesses adapted to receive the flanges of the staves and movable lengthwise thereof, heads having peripheral flanges extending outwardly and adapted to be seated on the offset portion of the staves, and means for detachably holding the heads to the staves.

10. A barrel comprising a plurality of independent staves having inwardly projecting flanges extending the greater part of the entire length of the staves at their edges, each stave having a curved body portion and having an offset part at the ends of the flanges forming a seat when the staves are held together, curved bar-like locking devices having means to engage the flanges of the staves and movable lengthwise thereof, and a head held against the offset part of the barrel staves.

This specification signed and witnessed this 22nd day of March, A. D. 1911.

JAMES H. GEORGE.

Witnesses:

W. A. TOWNER, Jr.,

C. BARTELS.

Copies of this patent may be obtained for five cents each, by addressing the "Commissioner of Patents, Washington, D. C."